UNITED STATES PATENT OFFICE.

PRYOR LEA, OF GOLIAD, TEXAS.

IMPROVEMENT IN COMPOUNDS OF BITUMEN, ORE, &c.

Specification forming part of Letters Patent No. 144,396, dated November 11, 1873; application filed January 8, 1872.

*To all whom it may concern:*

Be it known that I, PRYOR LEA, of Goliad, county of Goliad and State of Texas, have invented a new and useful Compound, which I call Bituminated Ore; and I do hereby declare that the following is a full, clear, and exact description thereof.

The solid material which I bituminate is ore, or ore with such admixtures mingled with it as are found in natural deposits, either alone or, as necessity may require, along with a metallic substance.

To produce my compound, one step is to prepare a very fluid composition, consisting of bitumen and water, to be incorporated with the firm material described herein. The proportion of the bitumen to the firm material depends on the kind of bitumen used, and the object for which the compound is desired, while the proportions of bitumen and water regulate the percentage of bitumen to be used in connection with the firm material, the former being, say, about ten per centum of the proposed amount of finished composition, and the latter being sufficient to approximate saturation of the fluid. The bitumen and the water are thoroughly mixed by stirring immediately preceding the introduction of the firm material, to secure diffusion of the bitumen with uniformity throughout the composition. Another step is to prepare the firm material. This must be ore, or ore with such admixtures mingled with it as are found in natural deposits, or the same with addition, as required, of metallic substances.

The solid material may be in quantity about two-thirds of the finished product. The proportions of ore and the bitumen may be varied some; but any quantity of bitumen greater than ten per centum would render the product too sticky for the purpose intended.

The ore with its incidents must be pulverized, while the other metallic matter must be either pulverized or granular. The firm ingredients must be completely dry and mixed before their incorporation with the fluid.

Another step, is to embed the firm matter in the fluid composition, as they are above described, until every particle of the former is thoroughly immersed in the latter, and a homogeneous mixture is obtained.

Another step, is to exclude the watery component and to compact the remainder, which two-fold object is attained, partly by evaporation, and partly by the application of considerable pressure, these operations being alternate and progressive until the permanent ingredients as a mass shall have become dense as desired.

The mechanical procedure being then completed, subsequent change in the product sustains the mechanical combination, and matures the mass partly from affinity of the permanent ingredients, and partly from the repugnance between bituminous matter and water. The product is a dense, durable, and economical composition, suitable for both small and massive structures, and for plastering and for other purposes.

The product or compound differs from other compounds or products, from the fact that the bitumen is carried by the water throughout the whole mass of pulverized or pulverized and granular firm material, and thus the particles receive separately upon themselves cementing material, which, together with the material, when the water is expelled by evaporation and pressure, forms a homogeneous or solid mass.

What I claim as my invention, and desire to secure by Letters Patent, is—

The new compound of bitumen and ore, or ore with its admixtures as found in natural deposit, or these with metallic substance added thereto when necessary, the proportions of the solid pulverized ore, or pulverized and granular material and with the bitumen, being about as specified, and the compound being as and for the purpose set forth.

PRYOR LEA.

Witnesses:
GEO. F. PENDEXTER,
A. M. WIGGINTON, Jr.